(12) United States Patent
Ono et al.

(10) Patent No.: US 7,640,131 B2
(45) Date of Patent: Dec. 29, 2009

(54) DATA ANALYSIS METHOD FOR ANALYZING FAILURE ROOT CAUSES FOR PRODUCTS

(75) Inventors: Makoto Ono, Kanagawa (JP); Yasunori Nishimoto, Kanagawa (JP); Hiroshi Fukuyama, Kanagawa (JP); Shigeyuki Nakagawa, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/731,015

(22) Filed: Mar. 28, 2007

(65) Prior Publication Data

US 2007/0244658 A1 Oct. 18, 2007

(30) Foreign Application Priority Data

Mar. 28, 2006 (JP) ............................. 2006-087474

(51) Int. Cl.
*G06F 19/00* (2006.01)
*G06F 17/40* (2006.01)
(52) U.S. Cl. .................. 702/108; 702/179; 702/185; 702/81; 700/110
(58) Field of Classification Search ................ 702/108, 702/81, 179, 185
See application file for complete search history.

(56) References Cited

U.S. PATENT DOCUMENTS

| | | | |
|---|---|---|---|
| 5,240,866 A * | 8/1993 | Friedman et al. ............... 702/35 |
| 6,452,240 B1 | 9/2002 | Ingvarsson et al. |
| 6,539,272 B1 * | 3/2003 | Ono et al. .................... 700/110 |
| 6,549,383 B1 | 4/2003 | Gill |
| 6,611,728 B1 * | 8/2003 | Morioka et al. ............. 700/109 |
| 6,870,716 B2 | 3/2005 | Gill |
| 7,038,889 B2 | 5/2006 | Freitag et al. |

(Continued)

FOREIGN PATENT DOCUMENTS

JP 09-027531 A 1/1997

(Continued)

OTHER PUBLICATIONS

Ono et al., "Accuracy of Yield Impact Calculation Based on Kill Ratio," *Advanced Semiconductor Manufacturing 2002 IEEE/SEMI Conference and Workshop*, pp. 87-91 (2002).

(Continued)

*Primary Examiner*—Hal D Wachsman
(74) *Attorney, Agent, or Firm*—Townsend and Townsend and Crew LLP; Darren Gold

(57) ABSTRACT

Embodiments of the present invention provide a data group for each parameter that is classified into a first group and a second group, based on the performance of the products, a base point of a distribution of the data group is calculated, based on the distribution, and a distance range from the base point is decided. The number of data within this range belonging to the first group is counted and substituted for variable FX, the number of data belonging to the second group is counted and substituted for variable SX, the number of data outside this certain range belonging to the first group is counted and substituted for variable FY, and the number of data belonging to the second group is counted and substituted for variable SY. Moreover, a failure content ratio is calculated from variables FX, FY, SX and SY, and the yield impact is calculated.

14 Claims, 14 Drawing Sheets

U.S. PATENT DOCUMENTS

| | | | |
|---|---|---|---|
| 2005/0021268 A1* | 1/2005 | Ono et al. | 702/81 |
| 2005/0071103 A1 | 3/2005 | Deng et al. | |
| 2006/0104110 A1 | 5/2006 | Sun et al. | |
| 2007/0156379 A1* | 7/2007 | Kulkarni et al. | 703/14 |

FOREIGN PATENT DOCUMENTS

| | | |
|---|---|---|
| JP | 2001-110867 A | 4/2001 |
| JP | 2003-186953 A | 7/2003 |

OTHER PUBLICATIONS

Wong, "Statistical Micro Yield Modeling," *Semiconductor International*, pp. 139-148 (Nov. 1996).

Hirono. "Applied Logistic Regression Analysis-Introduction of Application Examples To Quality Control" pp. 203-208 (1992).

Tango et al. "Logistic regression analysis" (1996).

Tanaka et al. "Statistical Analysis Handbook/Non-Parametric Method " (1999).

* cited by examiner

Fig. 2

Data group belonging to first group

| Item 1 | Item 2 | Item 3 |
|---|---|---|
| 24.395 | 0 | 0.11527 |
| 23.767 | 0 | 0.11611 |
| 24.26 | 0 | 0.11976 |
| 24.777 | 0 | 0.11542 |
| 24.372 | 3 | 0.11756 |
| 23.519 | 0 | 0.11596 |
| 23.634 | 0 | 0.12011 |
| 24.161 | 0 | 0.1151 |
| 24.068 | 0 | 0.12113 |
| 23.882 | 0 | 0.11709 |
| 23.873 | 0 | 0.11804 |
| 23.667 | 0 | 0.1199 |
| 23.94 | 0 | 0.11972 |
| 25.096 | 25 | 0.11473 |
| 24.053 | 0 | 0.11766 |
| 23.77 | 0 | 0.11823 |
| 23.287 | 0 | 0.11328 |
| 23.055 | 0 | 0.11759 |
| 23.934 | 1 | 0.12023 |
| 23.513 | 0 | 0.11293 |
| 24.597 | 0 | 0.11795 |
| 23.885 | 0 | 0.11897 |
| 23.276 | 0 | 0.11726 |
| 24.141 | 3 | 0.11048 |
| 23.723 | 0 | 0.11805 |
| 25.249 | 12 | 0.11848 |
| 23.177 | 0 | 0.11384 |
| 24.459 | 0 | 0.11658 |
| 23.496 | 0 | 0.11403 |
| 24.003 | 0 | 0.11857 |

Fig. 3

Data group belonging to second group

| Item 1 | Item 2 | Item 3 |
|---|---|---|
| 25.561 | 0 | 0.11832 |
| 24.554 | 0 | 0.11401 |
| 24.334 | 1 | 0.1147 |
| 24.035 | 2 | 0.11625 |
| 23.014 | 0 | 0.11515 |
| 26.148 | 0 | 0.11663 |
| 23.865 | 0 | 0.11962 |
| 25.115 | 0 | 0.11711 |
| 23.562 | 1 | 0.11379 |
| 24.304 | 0 | 0.11714 |
| 23.438 | 0 | 0.1169 |
| 22.13 | 2 | 0.11957 |
| 23.864 | 0 | 0.11851 |
| 24.155 | 3 | 0.11817 |
| 23.953 | 0 | 0.12068 |
| 25.397 | 0 | 0.11588 |
| 23.74 | 0 | 0.12211 |
| 22.857 | 5 | 0.1217 |
| 24.809 | 10 | 0.11758 |
| 25.817 | 0 | 0.11755 |

Fig. 5

| Item 1 | Group |
|---|---|
| 22.13 | Second |
| 22.857 | Second |
| 23.014 | Second |
| 23.055 | First |
| 23.177 | First |
| 23.276 | First |
| 23.287 | First |
| 23.438 | Second |
| 23.496 | First |
| 23.513 | First |
| 23.519 | First |
| 23.562 | Second |
| 23.634 | First |
| 23.667 | First |
| 23.723 | First |
| 23.74 | Second |
| 23.767 | First |
| 23.77 | First |
| 23.864 | Second |
| 23.865 | Second |
| 23.873 | First |
| 23.882 | First |
| 23.885 | First |
| 23.934 | First |
| 23.94 | First |
| 23.953 | Second |
| 24.003 | First |
| 24.035 | Second |
| 24.053 | First |

| 24.068 | First |
|---|---|
| 24.141 | First |
| 24.155 | Second |
| 24.161 | First |
| 24.26 | First |
| 24.304 | Second |
| 24.334 | Second |
| 24.372 | First |
| 24.395 | First |
| 24.459 | First |
| 24.554 | Second |
| 24.597 | First |
| 24.777 | First |
| 24.809 | Second |
| 25.096 | First |
| 25.115 | Second |
| 25.249 | First |
| 25.397 | Second |
| 25.561 | Second |
| 25.817 | Second |
| 26.148 | Second |

Data group belonging to first group

| Item 1 | Item 2 | Item 3 |
|---|---|---|
| 0.821451 | 0.299109 | 0.705782 |
| 0.385642 | 0.299109 | 0.363288 |
| 0.561965 | 0.299109 | 1.124929 |
| 1.555702 | 0.299109 | 0.644622 |
| 0.777243 | 0.312705 | 0.227921 |
| 0.862329 | 0.299109 | 0.424448 |
| 0.641284 | 0.299109 | 1.267635 |
| 0.371675 | 0.299109 | 0.775096 |
| 0.192917 | 0.299109 | 1.68352 |
| 0.164598 | 0.299109 | 0.036288 |
| 0.181897 | 0.299109 | 0.423632 |
| 0.577854 | 0.299109 | 1.182011 |
| 0.053115 | 0.299109 | 1.10862 |
| 2.16886 | 4.799339 | 0.925956 |
| 0.164085 | 0.299109 | 0.268695 |
| 0.379876 | 0.299109 | 0.501101 |
| 1.308261 | 0.299109 | 1.517166 |
| 1.754194 | 0.299109 | 0.240153 |
| 0.064647 | 0.095171 | 1.316562 |
| 0.873861 | 0.299109 | 1.659872 |
| 1.20972 | 0.299109 | 0.386936 |
| 0.158831 | 0.299109 | 0.802822 |
| 1.329404 | 0.299109 | 0.105602 |
| 0.333232 | 0.312705 | 2.658812 |
| 0.470215 | 0.299109 | 0.427709 |
| 2.462945 | 2.148146 | 0.603034 |
| 1.519695 | 0.299109 | 1.288837 |
| 0.944467 | 0.299109 | 0.171655 |
| 0.906537 | 0.299109 | 1.211368 |
| 0.067979 | 0.299109 | 0.639729 |

Fig. 16

Data group belonging to second group

| Item 1 | Item 2 | Item 3 |
|---|---|---|
| 3.062647 | 0.299109 | 0.537797 |
| 1.127069 | 0.299109 | 1.219522 |
| 0.704202 | 0.095171 | 0.938188 |
| 0.129487 | 0.108767 | 0.306206 |
| 1.833001 | 0.299109 | 0.754709 |
| 4.190933 | 0.299109 | 0.151268 |
| 0.197274 | 0.299109 | 1.067847 |
| 2.20538 | 0.299109 | 0.044443 |
| 0.779677 | 0.095171 | 1.309223 |
| 0.646538 | 0.299109 | 0.056675 |
| 1.018021 | 0.299109 | 0.041181 |
| 3.532158 | 0.108767 | 1.04746 |
| 0.199196 | 0.299109 | 0.615266 |
| 0.360142 | 0.312705 | 0.476637 |
| 0.028127 | 0.299109 | 1.500041 |
| 2.747419 | 0.299109 | 0.457066 |
| 0.437539 | 0.299109 | 2.083096 |
| 2.134774 | 0.720581 | 1.915926 |
| 1.61721 | 1.74027 | 0.236076 |
| 3.554711 | 0.299109 | 0.223844 |

DATA ANALYSIS METHOD FOR ANALYZING FAILURE ROOT CAUSES FOR PRODUCTS

CROSS-REFERENCE TO RELATED APPLICATION

The instant nonprovisional patent application claims priority from Japanese Patent Application No. 2006-087474 filed Mar. 28, 2006 and incorporated by reference in its entirety herein for all purposes.

BACKGROUND OF THE INVENTION

In manufacturing advanced device products such as a hard disk drive unit, an integrated circuit and a liquid crystal display, the fineness of the products and the complexity of a manufacturing process are remarkable, whereby it becomes difficult to manufacture the products according to the design drawing. Some of the products may become defective due to variations in various kinds of parameters in the manufacturing process. The manufacturing maker makes an effort to improve the yield by decreasing the defective products occurring in the manufacturing process as much as possible to reduce the manufacturing costs.

Therefore, it is required to analyze various kinds of parameters acquired in manufacturing the products, rapidly find a parameter that causes failure occurrence, and take measures for preventing the parameter from being varied. Particularly, if the measures can be taken in order from the parameter having the most influence on the lower yield, the products can be produced in a state where the yield is as high as possible, greatly contributing to the business.

The following techniques concerning the conventional data analysis method used to find out the parameter becoming causes of failure occurrence are well known.

For example, in patent document 1 (Japanese Laid-Open Patent No. A-9-27531), patent document 2 (Japanese Laid-Open Patent No. A-2003-186953) and patent document 3 (Japanese Laid-Open Patent No. A-2001-110867, a method for performing a simple regression analysis for the data group was disclosed in which the yield is taken along the vertical axis and each parameter is taken along the horizontal axis. However, the simple regression analysis presupposes that the data group conforms to a normal distribution, and is not appropriately applied to the data group not conforming to the normal distribution.

Also, a logistic regression analysis may be effectively employed to compute the data group indicating the ratio such as yield which is taken along the vertical axis, as described in non-patent document 1 (Tango, Yamaoka, Takagi: Logistic regression analysis, Asakura Shoten (1996)) and non-patent document 2 (Hirono: Applied logistic regression analysis— Introduction of application examples to quality control, Japan SAS user society treatise (SUGI-J), pp. 203-208 (1992)). Thus, it is considered that the logistic regression analysis is applied to the data group actually obtained at the time of manufacture, but while the contradictory result that as the number of defects increases the yield becomes better is true in some cases, it is not said that this logistic regression analysis is necessarily favorable.

Also, there is a method for classifying beforehand the data group obtained during the manufacture into the first group and the second group, based on the test results of the performance or yield of the products, and calculating the significant probability of the data group belonging to the first group and the data group belonging to the second group employing the T test or the analysis of variance (ANOVA) for each parameter, as described in patent document 3 and non-patent document 3 (Tanaka, Tarumi: Statistical analysis handbook/non-parametric method, Kyoritsu shuppan (1999)).

However, this method, like the simple regression analysis, and also presupposes that the data group conforms to the normal distribution, and can not be appropriately applied to the data group not conforming to the normal distribution. Also, in the T test or the analysis of variance, the value acquired as a result of the analysis is the statistical quantity of the significant probability, whereby there is a problem that it is not possible to estimate how much the yield is increased by taking measures for the parameter of interest.

An analysis method is provided in which the individual values of data are not noted, but the order of data is noted by arranging the data group in order of size, as described in non-patent document 4 (Tanaka, Tarumi: Statistical analysis handbook/non-parametric method, Kyoritsu shuppan (1999)) and patent document 4 (U.S. Patent Publication No. 2005/0071103A1). This analysis method is generally called a non-parametric method. Various methods as described in non-patent document 4 calculate the significant probability, like the T test and the analysis of variance, and can not estimate how much the yield is increased by taking measures for the parameter of interest. On the other hand, a method for graphically representing how much the yield of the final products is increased when the data group is arranged and the parts are destroyed in the order from the larger or smaller data value was described in patent document 4. This method is effective for increasing the yield of the final products by providing the strict specification values of parts built into the final products, and destroying the parts. However, it is not possible to estimate how much the yield is increased by improving the manufacturing process without changing the specification values of the parts.

The above methods as described in the patent documents 1 to 3 and the non-patent documents 1 to 3 depend on the distribution of data group, and are insufficient to select the parameter having the most significant influence on the occurrence of a failure by comparing the parameters having the data groups with various distributions. Also, there is another problem in not knowing how much the yield is increased in taking measures for the selected parameter.

On the other hand, the non-parametric methods as described in the patent document 4 and the non-patent document 4 can solve the above problem regarding the distribution of data group because they do not depend on the distribution of data group. Particularly, the method as described in the patent document 4 can quantify how much the yield of the final products is increased with respect to the quantity of destroyed parts. However, it is not possible to estimate how much the yield is increased by improving the manufacturing process without increasing the quantity of destroyed parts, as described above.

BRIEF SUMMARY OF THE INVENTION

Embodiments of the present invention provide a data analysis method that can estimate quantitatively how much the yield is increased by improving a manufacturing process by quantifying a yield impact on the yield of the product. A data group provided for each parameter is classified into a first group and a second group, based on the performance of the products, for each parameter, a base point of a distribution of the data group is calculated, based on the distribution, and a range of certain distance from the base point is decided. The number of data within this certain range belonging to the first group is counted and substituted for a variable FX, the number of data belonging to the second group is counted and substituted for a variable SX, the number of data outside this certain range belonging to the first group is counted and substituted for a variable FY, and the number of data belonging to the second group is counted and substituted for a variable SY. Moreover, a failure content ratio is calculated from the variables FX, FY, SX and SY, and the yield impact is calculated.

BRIEF DESCRIPTION OF THE DRAWINGS

FIG. 2 is a view showing an example of data group belonging to the first group in the embodiment.

FIG. 3 is a view showing an example of data group belonging to the second group in the embodiment.

FIG. 5 is a view showing one example of the relationship between the arranged data and the variable M and variable N in the repetition process in the embodiment.

FIG. 13 is a diagram showing one example of a data analysis apparatus according to the embodiment.

FIG. 15 is a view showing an example of normalizing the data group belonging to the first group in another embodiment.

FIG. 16 is a view showing an example of normalizing the data group belonging to the second group in another embodiment.

DETAILED DESCRIPTION OF THE INVENTION

Figure 1:
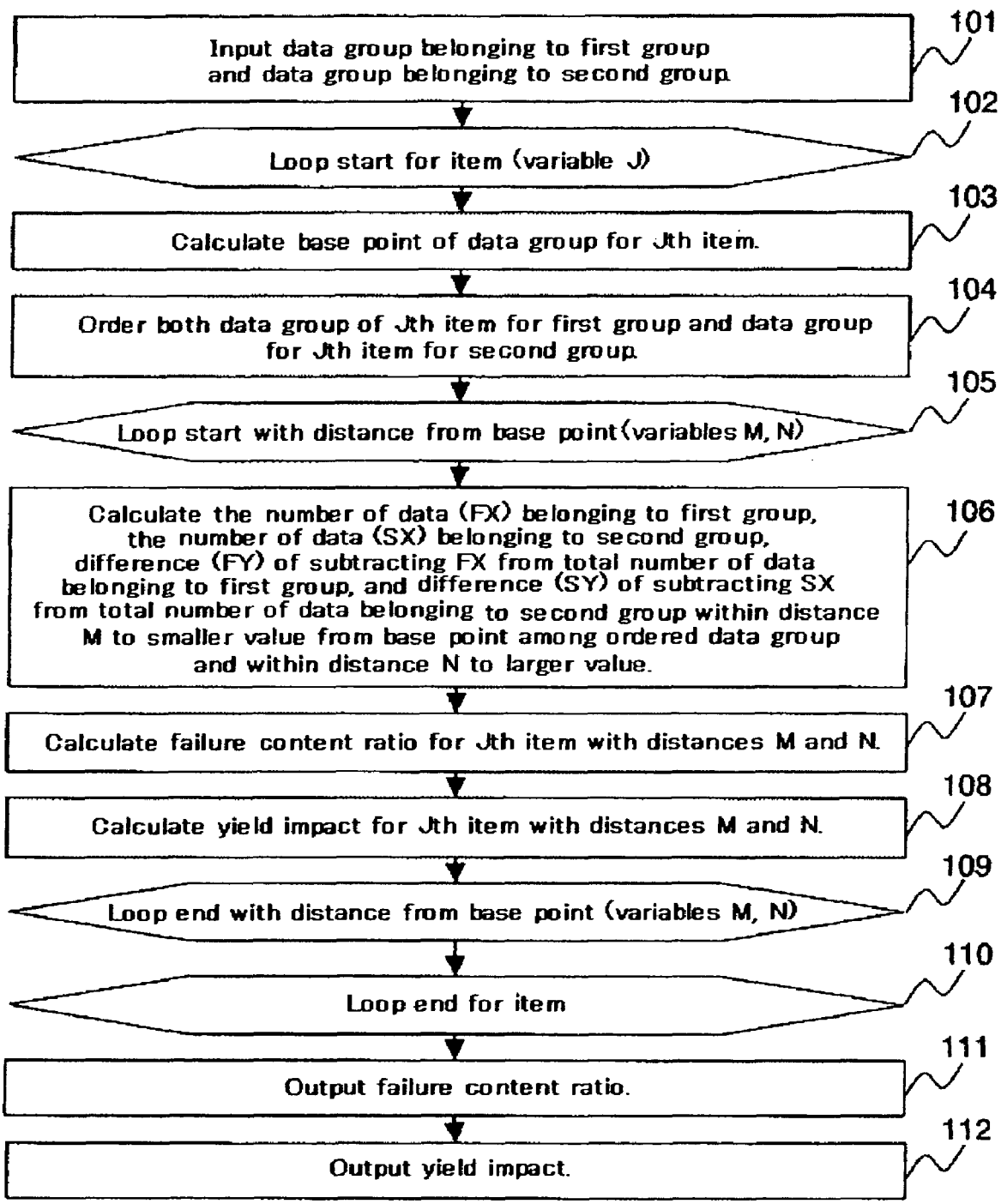
FIG. 1 is a flowchart showing one example of a procedure for processing the products according to an embodiment (embodiment 1) of the present invention.

The present invention relates to a data analysis method, and more particularly to a data analysis method for measuring and analyzing a number of parameters from products or manufacturing facilities for manufacturing the products to find causes of failure occurrence, a computer data analysis program for performing the method, and a data analysis system therefor.

An object of certain embodiments in accordance with the present invention is to provide a data analysis method that can estimate quantitatively how much the yield is increased by improving the manufacturing process without depending on the distribution of data group.

According to one embodiment of the present invention, there is provided a data analysis method for analyzing causes of failure for products by collating a plurality of parameters measured for the products or facilities for manufacturing the product, characterized by including a step of classifying a data group provided for each parameter into a first group and a second group, based on the performance of the products, for each parameter, a step of calculating a base point of a distribution of the data group, based on the distribution, a step of deciding a range of certain distance from the base point, a step of calculating the number of data (FX) within the range for the data group belonging to the first group, a step of calculating the number of data (FY) outside the range for the data group belonging to the first group, a step of calculating the number of data (SX) within the range for the data group belonging to the second group, a step of calculating the number of data (SY) outside the range for the data group belonging to the second group, a step of calculating a yield impact of the parameter on the occurrence of failure, based on the FX, the FY, the SX and the SY, and a step of outputting the calculated yield impact.

Embodiments in accordance with the present invention may comprise a data analysis system. That is, preferably, the data analysis system for analyzing causes of failure for products by collating a plurality of parameters measured for the products or facilities for manufacturing the products is characterized by comprising a user interface for inputting the data including a data group belonging to a first group and a data group belonging to a second group, and data processing means, connected to the user interface, for processing the data, the data processing means comprising means for classifying the data group provided for each parameter into the first group and the second group, based on the performance of the products, for each parameter, means for calculating a base point of a distribution of the data group, based on the distribution, means for deciding a range of certain distance from the base point, means for calculating the number of data (FX) within the range for the data group belonging to the first group, means for calculating the number of data (FY) outside the range for the data group belonging to the first group, means for calculating the number of data (SX) within the range for the data group belonging to the second group, means for calculating the number of data (SY) outside the range for the data group belonging to the second group, and means for calculating a yield impact of the parameter on the occurrence of failure, based on the FX, the FY, the SX and the SY, in which the yield impact calculated by the data processing means is outputted to the user interface.

Embodiments in accordance with the present invention may be also grasped as a program running on a computer to implement the above steps or means.

According to embodiments of the present invention, the yield impact of each of a number of parameters measured through the manufacturing process, for example, the parameters measured for the products or the parts built into the products, or the parameters measured for the manufacturing facilities or testers for use to manufacture the product or the parts built into the product on the yield of the product can be quantified. As a result, it is possible to estimate how much the yield is increased by improving the manufacturing process.

Embodiments in accordance with the present invention will be described below with reference to the drawings.

Embodiment 1

FIG. 1 shows one example of a procedure for calculating the yield impact of each of a plurality of parameters on the yield of products according to an embodiment 1 of the invention.

First of all, at step 101, a data group belonging to a first group and a data group belonging to a second group are inputted. The first group is the group defined as excellent products, for example, the data group associated with the products having the quality that can be shipped, or the data group of products judged as valuable to be forwarded to the next process. On the other hand, the second group is the group defined as bad products, for example, the data group associated with the products judged as defective in the manufacturing process.

Next, a process from step 102 to step 110 is repeated. This repetitive process depends on the number of parameters for the data group inputted at step 101, and is repeated by the number of parameters. That is, the same process is performed once for each parameter between step 102 and step 110. The number of repetitions is from 1 to the number of parameters. Variable J is defined as the item number of the parameter in this embodiment.

At step 103, a base point is calculated from the data group of the Jth item. The base point defines the value at which the most excellent products can be made, and is the mean value, the median, or the mode of the first group or the data group of excellent products, for example. Or the base point may be the mode of the ratio of the data groups of the first group and the second group, that is, define the value at which the defective products are most unlikely to occur. A calculation method of the base point will be described later in detail.

At step 104, both the data group of the first group and the data group of the second group are arranged. At this time, the attribute information indicating whether each data belongs to the first group or the second group is appended. In this embodiment, step 103 and step 104 are performed in this sequence, but may be performed reversely.

Next, a repetitive process from step 105 to step 109 is performed. This repetitive process is repeated by the number of times depending on where the base point calculated at step 103 is located in the data group arranged at step 104. In this embodiment, the variable M is defined to repeat the process from the base point to the smaller value of data, and the variable N is defined to repeat the process from the base point to the larger value of data. At step 106, a range within distance M and distance N from the base point in the arranged data group is determined based on the base point, the variable M and the variable N. Then, the number of data belonging to the first group within this range is counted and substituted for the variable FX, and the number of data belonging to the second group within this range is counted and substituted for the variable SX. Also, the number of data belonging to the first group from the data outside this range is counted and substituted for the variable FY, and the number of data belonging to the second group is counted and substituted for the variable SY.

At step 107, the variable FX, variable FY, variable SX and variable SY calculated at step 106 are substituted for formula of the following formula 1 to calculate the failure content ratio (FCR) outside this range.

$$FCR = 1 - (FY/(FY+SY))/(FX/(FX+SX)) \quad \text{Formula 1}$$

At step 108, the variable FX, variable FY, variable SX and variable SY calculated at step 106 and the computation result of the formula 1 calculated at step 107 are substituted for the following formula 2 to calculate the yield impact (YI).

$$YI = FCR \cdot (FY+SY)/(FX+FY+SX+SY) \quad \text{Formula 2}$$

Herein, the formulae 1 and 2 are application of the numerical expression for calculating the yield impact of particles on the yield employing the presence or absence of particles arising on semiconductor wafers in non-patent document 5. The failure content ratio (FCR) and the yield impact (YI) where the distance M and distance N are changed can be calculated by repeating this process from step 105 to step 109 for each parameter.

Also, the failure content ratio (FCR) and the yield impact (YI) can be calculated for each parameter by repeating the process from step 102 to step 110. Finally, the failure content ratio (FCR) is outputted at step 111, and the yield impact (YI) is outputted at step 112. Various output methods are provided but will be described later in detail.

FIG. 2 shows one example of data group belonging to the first group inputted at step 101. In this example, three items are provided as the parameters, and 30 rows of data are provided longitudinally.

FIG. 3 is a view showing one example of data group belonging to the second group inputted at step 101. In this example, three items are provided as the parameters, and 20 rows of data are provided longitudinally. The number of parameters and the number of data as shown in FIGS. 2 and 3 are only illustrative, but may not be limited.

It is required that the data group belonging to the first group as shown in FIG. 2 and the data group belonging to the second group as shown in FIG. 3 are composed of the same parameters. On the other hand, the number of data in the data group belonging to the first group as shown in FIG. 2 and the number of data in the data group belonging to the second group as shown in FIG. 3 may be different.

Next, the calculation method for the base point at step 103 will be described below taking the data of item 1 within the data group as shown in FIGS. 2 and 3 as an example. When the mean value of data in the first group is made the base point, the base point is 23.968 by rounding off the number to the third decimal place in this example. When the median of data in the first group is the base point, the base point is 23.9095 that is the mean value of 23.885 and 23.934, because the number of data is even in this example. Also, when the mode of data in the first group is the base point, the base point depends on how to decide the rank in creating the histogram, but if the rank is decided by dividing the interval between the minimum value 23.055 and the maximum value 25.249 of the data into five evenly, the rank from 23.4938 to 23.9326 is the mode of rank, and the mean value 23.7132 of 23.4938 and 23.9326 is the base point. Also, the base point may be calculated not only by employing the data in the first group, but also by comparing the data in the first group and the data in the second group.

Figure 4A:
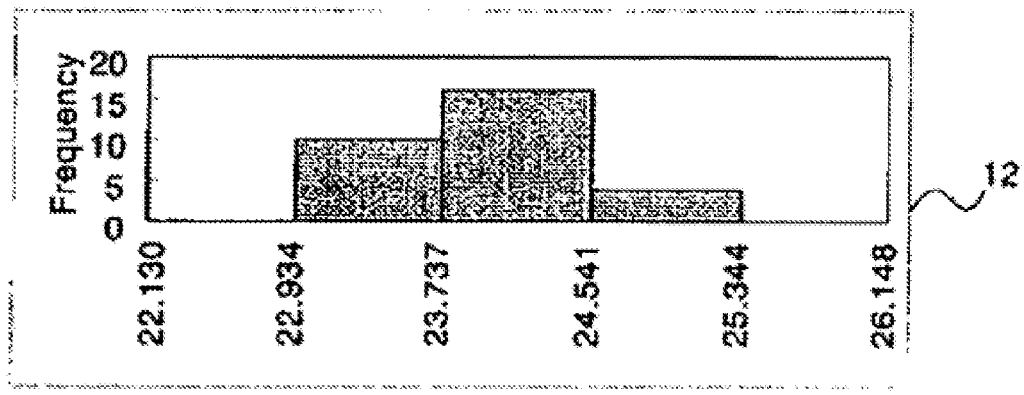
FIGS. 4(a)-4(c) are views showing one example of a calculation method for the base point in the embodiment.
Figure 4B:
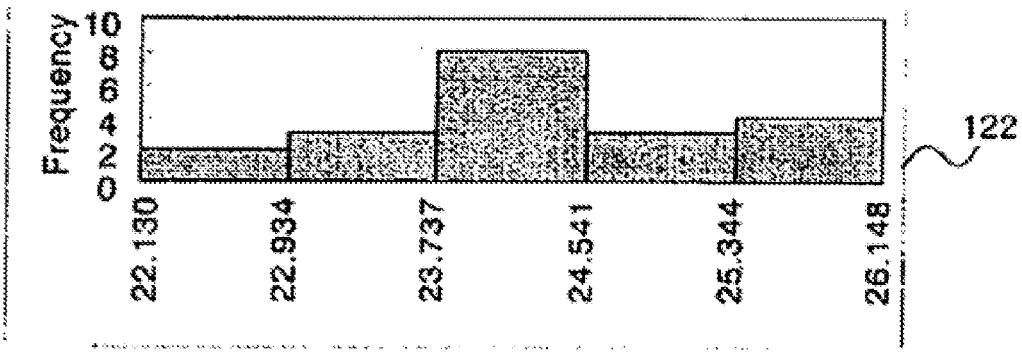
Figure 4C:
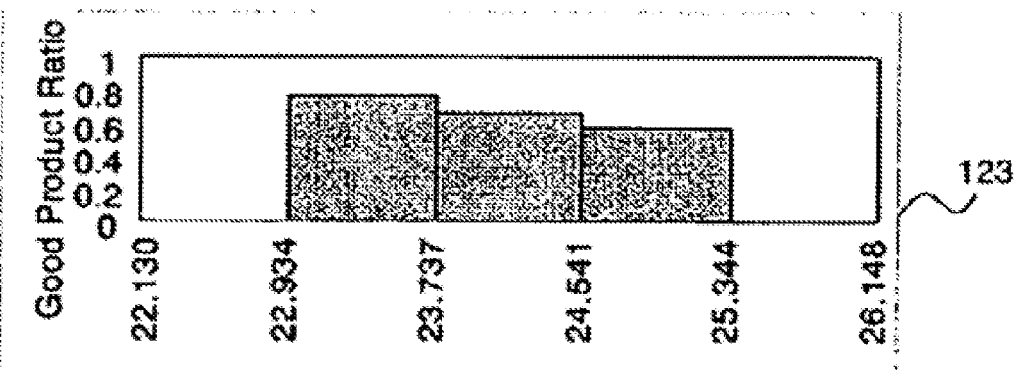

FIG. 4 shows one example of the calculation method for the base point by comparing the data in the first group and the data in the second group.

Reference numeral 121 designates a histogram for the first group data, and reference numeral 122 designates a histogram for the second group data. Also, reference numeral 123 designates a histogram of the quotient that is the frequency of the first group divided by the sum of the frequency of the first group and the frequency of the second group for each rank of the histograms 121 and 122. In this example, the histogram is created by dividing the interval between the minimum value 22.130 and the maximum value 26.148 for both the data of the first group and the data of the second group into five evenly, so that the histograms 121 and 122 are drawn. Also, the distribution 123 is drawn from 121 and 122. It will be clear that the rank between 22.934 and 23.737 is the mode of the rank from the distribution 123, and the mean value 23.3354 between 22.934 and 23.737 is the base point. In this way, there are various methods for calculating the base point, whereby the person who applies this embodiment of the invention should select the optimal method in accordance with the features of the actually input data group.

FIG. 5 shows one example of the relationship between the data arranged at step 104 and the variable M and variable N in the repetition process from step 105 to step 109. Herein, this example will be described below using the data of item 1 in the data groups as shown in FIGS. 2 and 3.

At step 104, both the data group of the first group and the data group of the second group are arranged. At this time, the attribute information indicating whether each data belongs to the first group or the second group is appended.

In FIG. 5, the table is divided into two on account of limited space, but may not be particularly divided. The broken line 131 indicates the position of the base point calculated as the median of the data of the first group. The broken line 132 indicates a boundary for processing the steps 106, 107 and 108 when the variable M is 7. The broken line 133 indicates a boundary for processing the steps 106, 107 and 108 when the variable N is 4.

In the illustrated example, at step 106, the variable FX=8 is calculated from the number of data belonging to the first group between the broken lines 132 and 133, and the variable SX=3 is calculated from the number of data belonging to the second group between the broken lines 132 and 133. The variable FY=30−8=22 is calculated because the total number of data belonging to the first group is 30, and the variable SY=20−3=17 is calculated because the total number of data belonging to the second group is 20. At step 107, the failure content ratio (FCR) rounded off to the third decimal place is calculated as 0.224, namely, 22.4%. At step 108, the yield impact (YI) is calculated as 0.175, namely, 17.5%. Different failure content ratios (FCR) and yield impacts (YI) are calculated by changing the variable M and the variable N in the repetitive process from step 105 to step 109.

Figure 6:
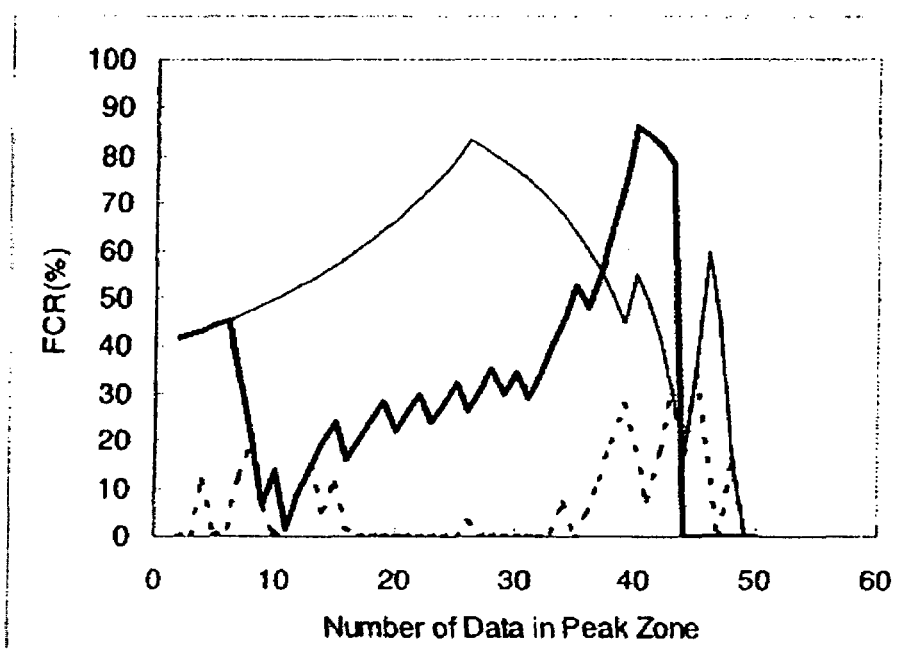
FIG. 6 is a view showing an output example of failure content ratio in the embodiment.
Figure 7:
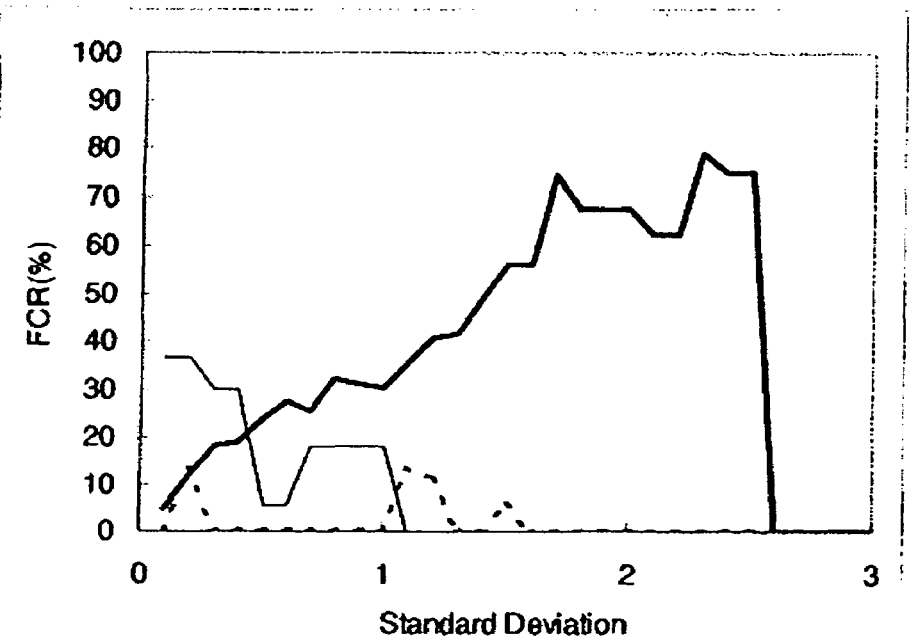
FIG. 7 is a view showing another output example of failure content ratio in the embodiment.

FIGS. 6 and 7 are the views showing the examples of outputting the calculated failure content ratio at step 111.

FIG. 6 shows one example of a graph in which the calculated failure content ratio is taken along the vertical axis and the sum of variable M and variable N is taken along the horizontal axis. The polygonal line indicated by the solid heavy line represents the failure content ratio of item 1, the polygonal line indicated by the solid fine line represents the failure content ratio of item 2, and the polygonal line indicated by the broken line represents the failure content ratio of item 3. The value of the failure content ratio is different, depending on the combination of variable M and variable N, even if the sum of variable M and variable N is equal. The graph of the example represents the results where the variable M is equal to the variable N. Essentially, the parameter for the polygonal line with the great failure content ratio can be judged as a cause of decreasing the yield most significantly. However, if the non-parametric value such as the sum of variable M and variable N is taken along the horizontal axis as in this example, it is difficult to judge which of the item 1 with the solid heavy line and the item 2 with the solid fine line has a greater failure content ratio as problematical parameter.

FIG. 7 shows one example of a display method for the graph to solve this problem.

This graph represents the specification value of the data corresponding to the distance M and the distance N by normalizing each data with the value (BP) of the base point and the standard deviation ($\sigma$) of the data of the first group, employing the following formula 3, instead of taking the calculated failure content ratio along the vertical axis and the sum of variable M and variable N along the horizontal axis.

$$X=|(x-BP)/\sigma| \quad \text{Formula 3}$$

There are various combinations of variable M and variable N as in the example of FIG. 6. This graph represents the polygonal line in a case where the specification value of the data corresponding to the variable M and the specification value of the data corresponding to the variable N are almost equal. By drawing this graph, the parameter having the greater failure content ratio than in FIG. 6 can be found at first sight. Specifically, the item 1 of the solid heavy line is the notable important parameter, because the failure content ratio increases as the value is greater along the horizontal axis.

Figure 8:
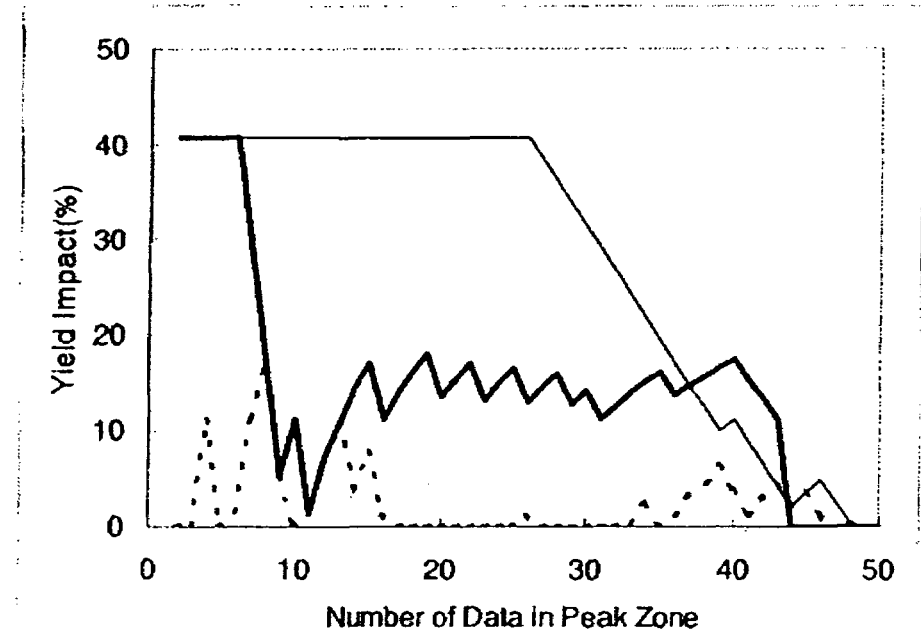
FIG. 8 is a view showing an output example of yield impact in the embodiment.
Figure 9:
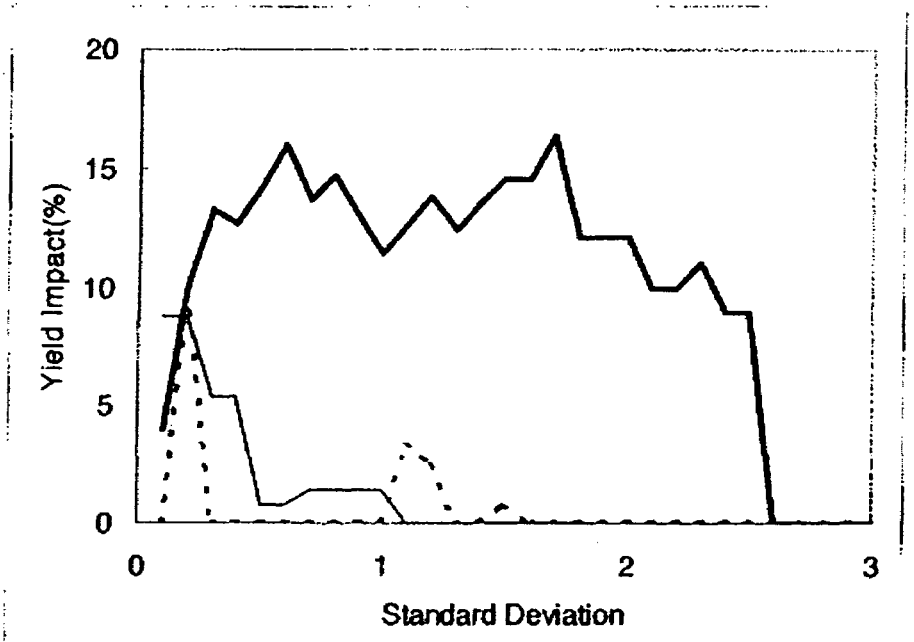
FIG. 9 is a view showing another output example of yield impact in the embodiment.
Figure 10:
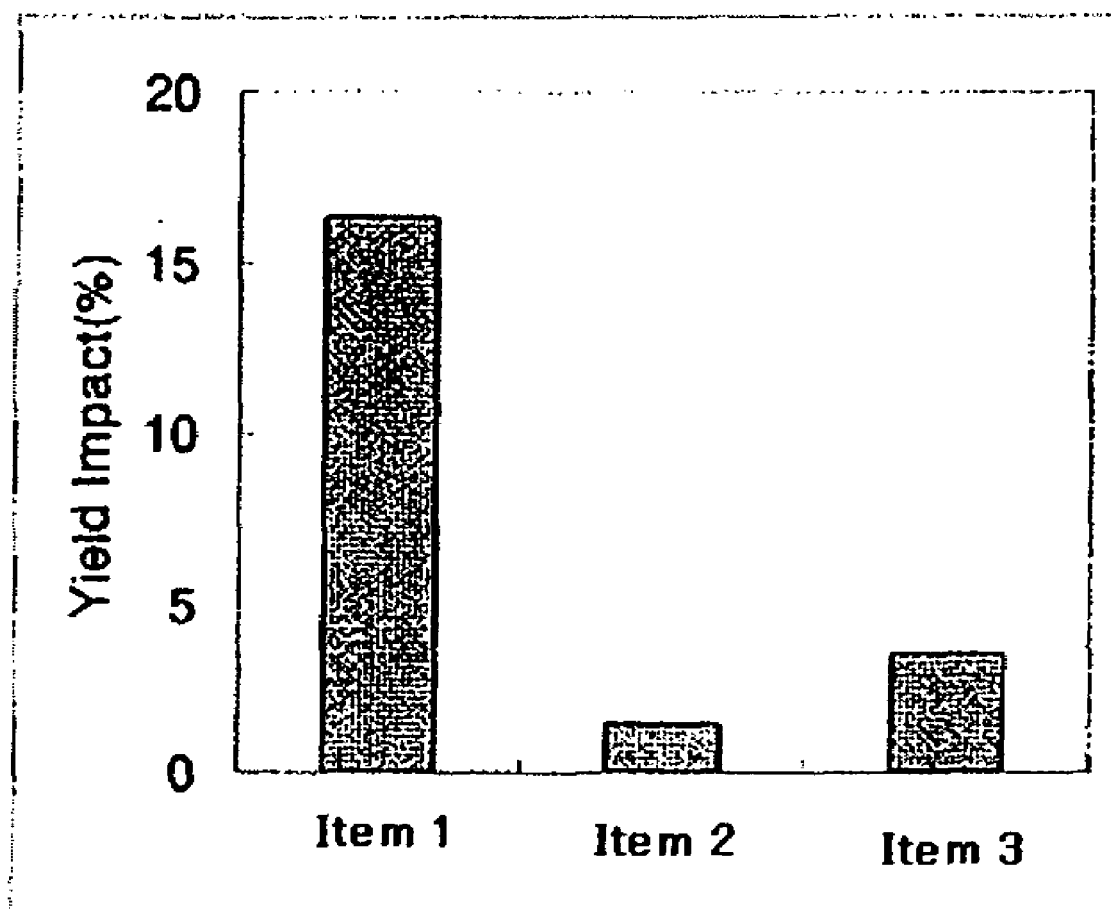
FIG. 10 is a view showing another output example of yield impact in the embodiment.

FIGS. 8 to 10 are the views showing the examples of a method for outputting the calculated yield impact at step 112. FIG. 8 is a view of representing the yield impact along the vertical axis, like FIG. 6, and FIG. 9 is a view of representing the yield impact along the vertical axis, like FIG. 7. In FIG. 8, it appears that the yield impact for the item 2 of the solid fine line is the greatest up to the value slightly less than 30 along the horizontal axis. However, this only means that the data of the item 2 is almost zero, and does not affect the yield impact even if the variable M and the variable N are increased.

On the other hand, in FIG. 9, it can be found that the parameter having the greatest yield impact is the item 1 of the solid heavy line at first sight. Herein, it should be noted here that when the value of the horizontal axis is small, namely, when the variable M and the variable N have the small values, the denominator of the formula 1 is unstable, and the accuracy of the calculated failure content ratio is bad, so that the accuracy of the calculated yield impact is also bad.

Thus, it is suitable for utilizing the invention to select the parameter having the great yield impact by observing a portion in which the value of the horizontal axis of FIG. 9 is greater than 0.5, for example. FIG. 10 is one example representing the maximum value of each polygonal line for the portion in which the value is greater than 0.5 along the horizontal axis of FIG. 9 with a bar graph. This graph has missing information as compared with FIGS. 8 and 9, but is a good example in which the invention is applied in the respect of viewability. From this bar graph, it will be found that the parameter having the greatest yield impact, namely, the parameter to be most considered is the item 1.

Next, an example in which the data analysis method according to this embodiment is applied to a manufacturing process for a hard disk drive unit will be described below.

Figure 11:
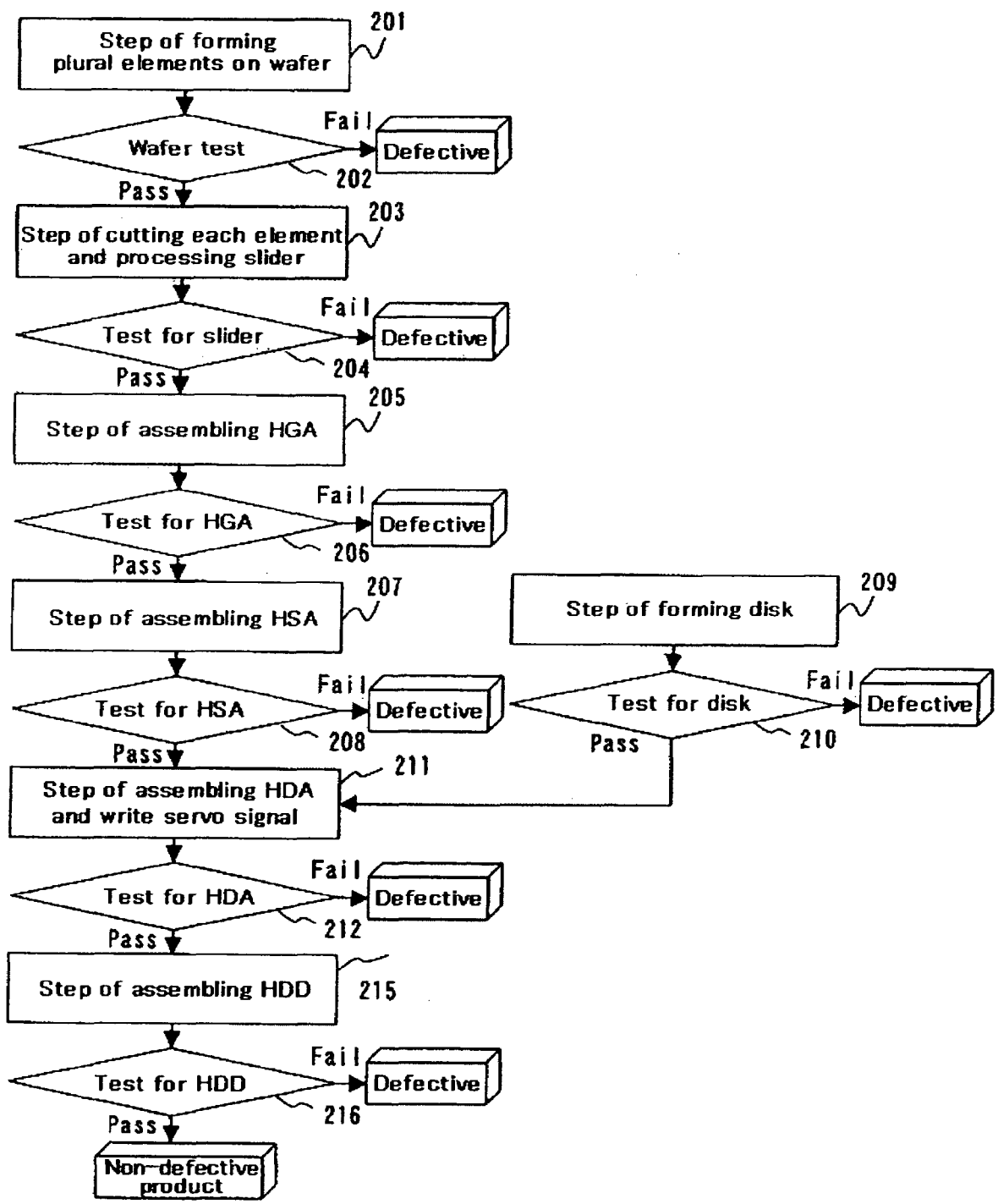
FIG. 11 is a flowchart showing a manufacturing process for the hard disk drive unit in the embodiment.

FIG. 11 is a flowchart diagrammatically showing the manufacturing process for the hard disk drive unit. The hard disk drive unit is made of a number of parts, but among others, the manufacturing process for a magnetic head and a disk as the main parts and a final assembling process are illustrated in this example. The magnetic head is formed through a process including a step 201 of forming a plurality of elements on a wafer, a testing step 202 of the wafer, a step 203 of cutting each element and processing a slider, a testing step 204 of the slider, a step 205 of assembling an HGA (Head Gimbal Assembly) by combining the parts such as each slider and a suspension, a testing step 206 for the HGA, a step 207 of assembling an HSA (Head Stack Assembly) by combining the parts such as a plurality of HGAs and a flexible printed board, and a testing step 208 for the HSA.

The disk is formed through a step 209 of forming the disk and a testing step 210 for the disk. Then, a step 211 of assembling an HDA (Head Disk Assembly) by combining the parts such as the HSA, the disk and the frame and writing a servo signal, a testing step 212 for the HDA, a step 215 of assembling an HDD by combining the parts such as the HDA and the printed board, and a testing step 216 for the HDD are performed, whereby the hard disk drive unit is completed. In the manufacturing process for this hard disk drive unit, whether the product passes or fails is determined at each testing step.

In applying this embodiment to the data acquired through this manufacturing process, the data associated with the product determined as non-defective at the testing step 216 for the HDD is defined as the data of the first group, and the data associated with the product determined as defective at the testing step 216 for the HDD is defined as the data of the second group, for example.

Also, the data associated with the product determined as non-defective at the testing step 216 for the HDD is defined as the data of the first group, and not only the data associated with the product determined as defective at the testing step 216 for the HDD is defined as the data of the second group, but also the data associated with the product determined as defective at the testing step 216 for the HDD, the data associated with the product determined as defective at the testing step 212 for the HDA, and the data of the magnetic head determined as defective at the testing step 208 for the HSA may be defined as the data of the second group to apply this embodiment.

For example, in analyzing the problems at the step of forming a plurality of elements on the wafer and the step of cutting each element and processing the slider, the data related to the slider determined as non-defective at the testing step 204 for the slider may be defined as the data of the first group, and the data related to the slider determined as defective at the testing step 204 for the slider may be defined as the data of the second group to apply this embodiment.

Also, in analyzing the problems at the step of forming a plurality of elements on the wafer, the data related to the magnetic head determined as non-defective at the testing step 206 for the HGA may be defined as the data of the first group, and the data related to the magnetic head determined as defective at the testing step 206 for the HGA and the data related to the slider determined as defective at the testing step 204 for the slider may be defined as the data of the second group to apply this embodiment.

Since the plurality of elements are formed on the wafer at step 201, some magnetic heads composed of the elements formed from the same wafer are determined as non-defective at the testing step 204 for the slider, and others are determined as defective. Thus, to classify the data related to each wafer into the data of the first group and the data of the second group, a method for dividing the wafers into the wafer group in which the sliders determined as non-defective at the testing step 204 for the slider are mostly formed and the wafer group in which the sliders determined as defective are mostly formed may be adopted to apply this embodiment.

Figure 12:
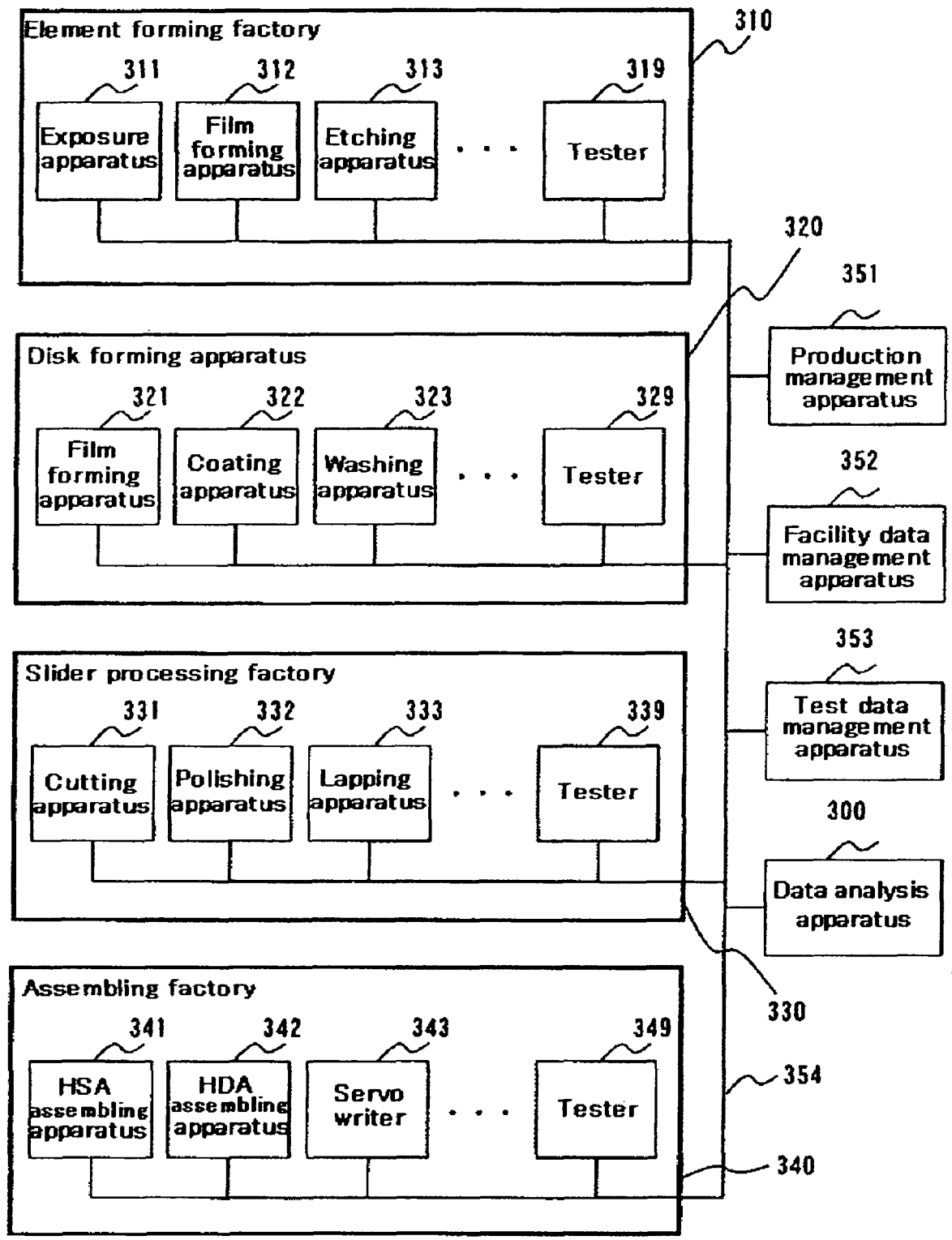
FIG. 12 is a schematic view showing a manufacturing plant for the hard disk drive unit in the embodiment.
Figure 1:
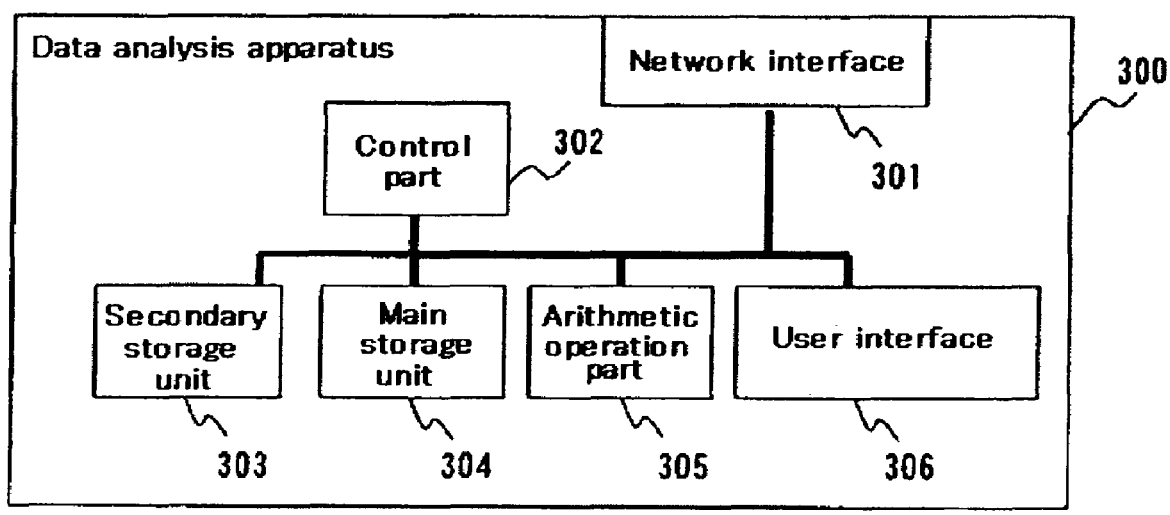

FIG. 12 is a schematic view showing a manufacturing plant for the hard disk drive unit.

In this example, an element forming factory 310 performs the step 201 and the step 202 of FIG. 11, and a disk forming factory 320 performs the step 209 and the step 210. Also, a slider processing factory 330 performs the step 203 and the step 204, and an assembling factory 340 performs the step 205, step 206, step 207, step 208, step 211, step 212, step, 215, and step 216. In each factory, there are various kinds of manufacturing apparatuses and testers, which are all connected via a network 354, and connected to a production management apparatus 351, a facility data management apparatus 352, a test data management apparatus 353, and the data analysis apparatus 300.

For example, there are some manufacturing facilities such as an exposure apparatus 311 and a film forming apparatus 312 in the element forming factory 310, in which the data measured by a positioning sensor for the exposure apparatus 311 is stored and managed together with the serial number of the processed wafer in the facility data management apparatus 352, and the data measured by a gas flow sensor for the film forming apparatus 312 is stored and managed together with the serial number of the processed wafer in the facility data management apparatus 352. Also, there is a tester 319 for performing the step 202 in the element forming factory 310, in which the data measured by the tester 319 is stored and managed together with the serial number of the processed wafer and the measurement coordinates on the wafer in the test data management apparatus 353. Likewise, the data obtained from each manufacturing facility in the disk forming factory 320, the slider processing factory 330 and the assembling factory 340 or the data obtained from each tester is stored and managed in the facility data management apparatus 352 or the test data management apparatus 353.

This embodiment is applied to the data analysis apparatus 300. The data analysis apparatus 300 acquires the data obtained from each manufacturing facility via the network 354 from the facility data management apparatus 352, and acquires the data obtained from each tester via the network 354 from the test data management apparatus 353. The data analysis apparatus 300 classifies these acquired data into the data of the first group and the data of the second group to perform the analysis.

FIG. 13 is a block diagram of the data analysis apparatus 300 according to the embodiment.

The data analysis apparatus 300 comprises a network interface 301, a control part 302, a secondary storage unit 303, a main storage unit 304, an arithmetic operation part 305, and a user interface 306 having a data input part and a display part. This may be a general-purpose computer such as a PC (personal computer), in which the data analysis method according to this embodiment is performed by executing a computer program on this apparatus.

As described above, according to this embodiment, the parameter becoming a factor for decreasing the yield most significantly can be found efficiently, by employing various parameters acquired through the manufacturing process for the products such as the hard disk drive unit, for example. As a result, the parameters to be considered can be narrowed down, whereby there is the effect that the yield is increased more rapidly than conventionally. Also, the above embodiment is applied to the manufacturing process for the hard disk drive unit, but may be limited to other apparatuses or products, for example, an integrated circuit, a flat panel display, a printed board and medicaments.

Embodiment 2

Figure 14:
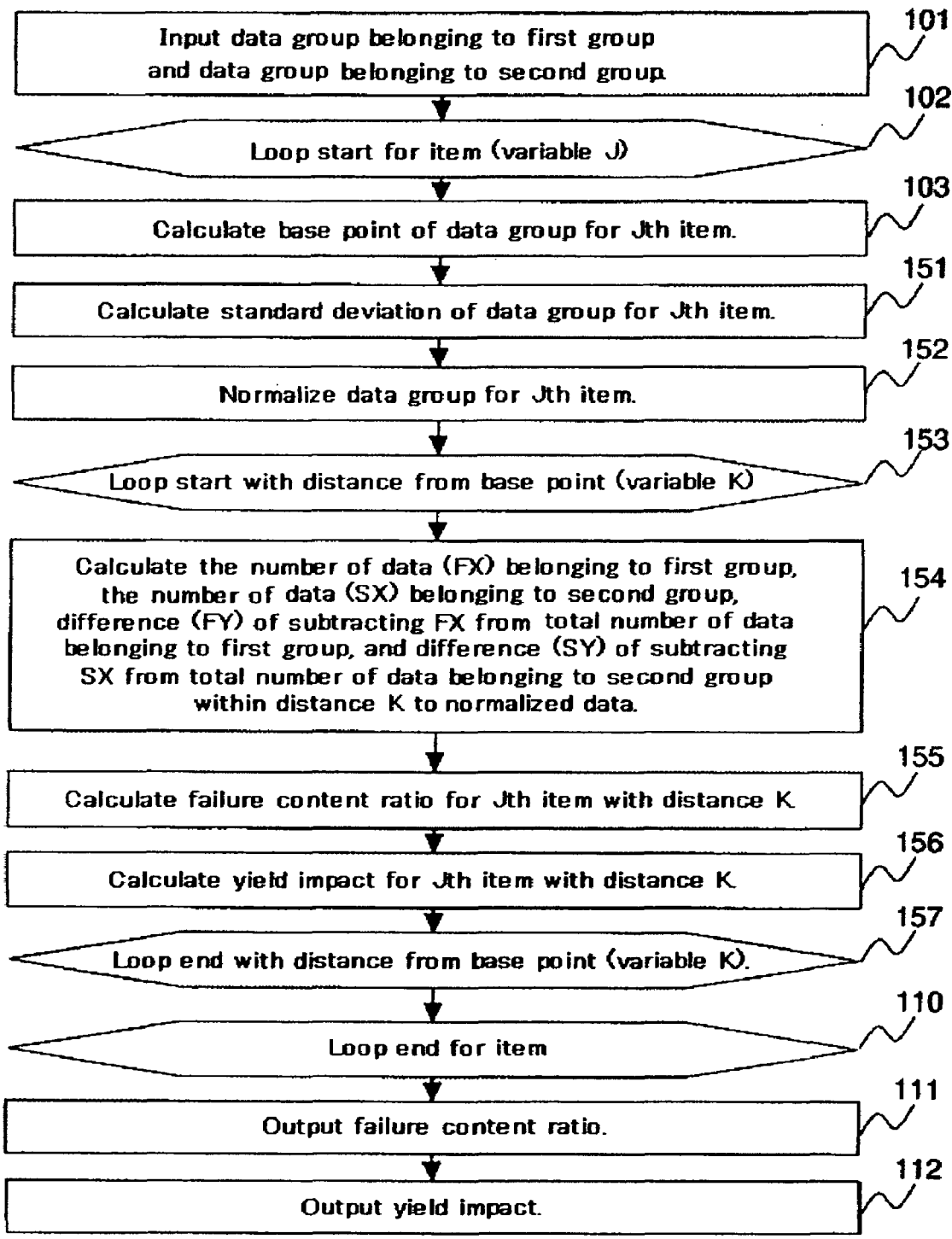
FIG. 14 is a flowchart showing one example of a procedure for processing the products according to another embodiment (embodiment 2).

Referring to FIGS. 14 to 16, a second embodiment will be described below.

The example as shown in FIG. 1 is a procedure for calculating the failure content ratio and the yield impact strictly. That is, after the base point is calculated, the failure content ratio and the yield impact are calculated by changing two variables M and N. However, only to obtain the graphs of FIGS. 7, 9 and 10, the failure content ratio and the yield impact can be calculated in accordance with a procedure as shown in FIG. 14.

In an example of FIG. 14, the failure content ratio and the yield impact are calculated by changing one variable K, instead of the variable M and the variable N.

Herein, step 101 is the same as in FIG. 1. Also, the repetition conditions from step 102 to step 110 are the same. Step 103 is the same as in FIG. 1.

At step 151, the standard deviation (6) is calculated from the data group of the Jth item. Then, at step 152, the base point (BP) calculated at step 103 and the standard deviation ($\sigma$)

calculated at step 151 are substituted for the formula 3, and the data of the first group and the data of the second group are normalized.

FIG. 15 shows an example in which the data group of the first group is normalized and FIG. 16 shows an example in which the data group of the second group is normalized.

In the example, the base point is calculated employing the mean value of the data group of the first group, and the data is normalized based on its result. For the item 1, the base point (BP) is 23.96763, and the standard deviation ($\sigma$) is 0.520258. For the item 2, the base point (BP) is 1.466667, and the standard deviation ($\sigma$) is 4.903453. For the item 3, the base point (BP) is 0.117001, and the standard deviation ($\sigma$) is 0.002453.

Then, a process from step 153 to step 157 is repeated with the variable K. The variable K is repeated by dividing the interval from 0.1× standard deviation ($\sigma$) to 3.0× standard deviation ($\sigma$) into several blocks. At step 154, the number of data belonging to the first group within the distance K to the normalized data group is substituted for the variable FX, and the number of data belonging to the second group is substituted for the variable SX. Also, a difference that the variable FX is subtracted from the total number of data belonging to the first group is substituted for the variable FY, and a difference that the variable SX is subtracted from the total number of data belonging to the second group is substituted for the variable SY.

At step 155, the failure content ratio (FCR) is calculated by substituting the variable FX, variable SX, variable FY and variable SY calculated at step 154 for the formula 1. Then, at step 156, the yield impact (YI) is calculated by substituting the variable FX, variable SX, variable FY and variable SY calculated at step 154 and the failure content ratio (FCR) calculated at step 154 for the formula 2. Lastly, at steps 111 and 112, the graphs of FIGS. 7, 9 and 10 are outputted.

To draw the graph of FIG. 10, the repetition process with the variable K may be omitted, and the failure content ratio (FCR) and the yield impact (YI) may be calculated only with the variable K=1.0× standard deviation ($\sigma$), for example.

What is claimed is:

1. A computer-usable medium having computer readable instructions stored thereon for execution by a processor to perform a data analysis method for analyzing failure root causes for products by collating a plurality of parameters measured for said products or facilities for manufacturing said products, the data analysis method including:

a step of classifying a data group provided for each parameter into a first group and a second group based on the performance of the products for each parameter;

a step of calculating a base point of a distribution of said data group based on a distribution of said first group and said second group;

a step of deciding a distance range from said base point;

a step of calculating the number of data (FX) within said distance range for the data group belonging to said first group;

a step of calculating the number of data (FY) outside said distance range for the data group belonging to said first group;

a step of calculating the number of data (SX) within said distance range for the data group belonging to said second group;

a step of calculating the number of data (SY) outside said distance range for the data group belonging to said second group;

a step of calculating a yield impact of said parameter on the occurrence of failure based on said FX, said FY, said SX and said SY; and a step of outputting said calculated yield impact to a user interface of a computer system used by said processor.

2. The computer-usable medium according to claim 1, characterized in that the step of deciding said distance range includes changing the distances from said base point, calculating said FX, said FY, said SX and said SY for said changed each range, and outputting said yield impacts in said ranges of the changed distance.

3. The computer-usable medium according to claim 2, characterized in that the step of calculating the base point of the distribution based on the distribution of said data group includes computing a failure content ratio distribution from said data group belonging to said first group and said data group belonging to said second group, and calculating the mode of the failure content ratio distribution.

4. The computer-usable medium according to claim 2, characterized in that the step of calculating the yield impact of said parameter on the occurrence of failure includes a step of calculating a quotient (DX) that is the value of said FX divided by the sum of said FX and said SX and a quotient (DY) that is the value of said FY divided by the sum of said FY and said SY, and a step of calculating a difference (C) of the quotient of said DY divided by said DX subtracted from 1.

5. The computer-usable medium according to claim 2, characterized in that the step of calculating the base point of the distribution based on the distribution of said data group includes calculating the mean value of said data group belonging to said first group.

6. The computer-usable medium according to claim 2, characterized in that the step of calculating the base point of the distribution based on the distribution of said data group includes calculating the median of said data group belonging to said first group.

7. The computer-usable medium according to claim 2, characterized in that the step of calculating the base point of the distribution based on the distribution of said data group includes calculating the mode of said data group belonging to said first group.

8. The computer-usable medium according to claim 1, characterized in that the step of calculating the yield impact of said parameter on the occurrence of failure includes a step of calculating a quotient (DX) that is the value of said FX divided by the sum of said FX and said SX and a quotient (DY) that is the value of said FY divided by the sum of said FY and said SY, and a step of calculating a difference (C) of the quotient of said DY divided by said DX subtracted from 1.

9. The computer-usable medium method according to claim 8, characterized in that the step of calculating the yield impact of said parameter on the occurrence of failure includes a step of calculating a product of multiplying said difference (C) and the sum of said FY and said SY and calculating a quotient (R) that is the value of said product divided by the sum of said FX, said FY, said SX and said SY.

10. The computer-usable medium method according to claim 1, characterized in that the step of calculating the base point of the distribution based on the distribution of said data group includes calculating the mean value of said data group belonging to said first group.

11. The computer-usable medium according to claim 1, characterized in that the step of calculating the base point of the distribution based on the distribution of said data group includes calculating the median of said data group belonging to said first group.

12. The computer-usable medium according to claim 1, characterized in that the step of calculating the base point of the distribution based on the distribution of said data group includes calculating the mode of said data group belonging to said first group.

13. A data analysis system for analyzing failure root causes for products by collating a plurality of parameters measured for said products or facilities for manufacturing said products, said system characterized by comprising:
- a user interface for inputting the data including a data group belonging to a first group and a data group belonging to a second group; and
- data processing means, connected to said user interface, for processing the data;
- said data processing means comprising:
- means for classifying the data group provided for each parameter into the first group and the second group based on the performance of the products for each parameter;
- means for calculating a base point of a distribution of said data group, based on a distribution of said first group and said second group;
- means for deciding a distance range from said base point;
- means for calculating the number of data (FX) within said distance range for the data group belonging to said first group;
- means for calculating the number of data (FY) outside said distance range for the data group belonging to said first group;
- means for calculating the number of data (SX) within said distance range for the data group belonging to said second group;
- means for calculating the number of data (SY) outside said distance range for the data group belonging to said second group; and
- means for calculating a yield impact of said parameter on the occurrence of failure based on said FX, said FY, said SX and said SY;
- in which said yield impact calculated by said data processing means is outputted to said user interface.

14. A data analysis program for making a data analysis for analyzing failure root causes for products by collating a plurality of parameters measured for said products or facilities for manufacturing said products said program embodied on a computer readable storage medium with executions being executed on a computer, characterized by comprising:
- means for classifying a data group provided for each parameter into a first group and a second group, based on the performance of the products, for each parameter;
- means for calculating a base point of a distribution of said data group based on a distribution of said first group and said second group;
- means for deciding a distance range from said base point;
- means for calculating the number of data (FX) within said distance range for the data group belonging to said first group;
- means for calculating the number of data (FY) outside said distance range for the data group belonging to said first group;
- means for calculating the number of data (SX) within said distance range for the data group belonging to said second group;
- means for calculating the number of data (SY) outside said distance range for the data group belonging to said second group;
- means for calculating a yield impact of said parameter on the occurrence of failure based on said FX, said FY, said SX and said SY; and
- means for outputting said calculated yield impact to a user interface associated with said computer.

* * * * *